United States Patent [19]

Bauer et al.

[11] Patent Number: 5,434,407
[45] Date of Patent: Jul. 18, 1995

[54] AUTOMATIC REARVIEW MIRROR INCORPORATING LIGHT PIPE

[75] Inventors: Frederick T. Bauer; Jon H. Bechtel, both of Holland, Mich.

[73] Assignee: Gentex Corporation, Zeeland, Mich.

[21] Appl. No.: 110,373

[22] Filed: Aug. 23, 1993

[51] Int. Cl.⁶ .............................................. H01J 5/16
[52] U.S. Cl. ................................. 250/227.24; 359/604
[58] Field of Search ............... 250/227.11, 206, 214 B, 250/214 D, 214 AL, 227.24; 359/601, 602, 603, 604, 742; 385/12, 143, 146

[56] References Cited

U.S. PATENT DOCUMENTS

| | | | |
|---|---|---|---|
| 4,443,057 | 4/1984 | Bauer et al. | 250/214 B |
| 4,693,553 | 9/1987 | Sasaki et al. | 385/143 |
| 4,917,477 | 4/1990 | Bechtel et al. | 359/603 |
| 4,936,657 | 6/1990 | Tejima et al. | 359/742 |
| 5,031,991 | 7/1991 | Nakatsu et al. | 359/742 |
| 5,204,778 | 4/1993 | Bechtel | 359/604 |
| 5,315,673 | 5/1994 | Stetter et al. | 385/12 |

*Primary Examiner*—David C. Nelms
*Assistant Examiner*—Que T. Le
*Attorney, Agent, or Firm*—Malcolm R. McKinnon

[57] ABSTRACT

An improved automatic rearview mirror for automotive vehicles, the mirror incorporating a light pipe effective to direct light from a convenient location to a conveniently placed light sensor and effective to optimize the performance and economy of the mirror.

9 Claims, 3 Drawing Sheets

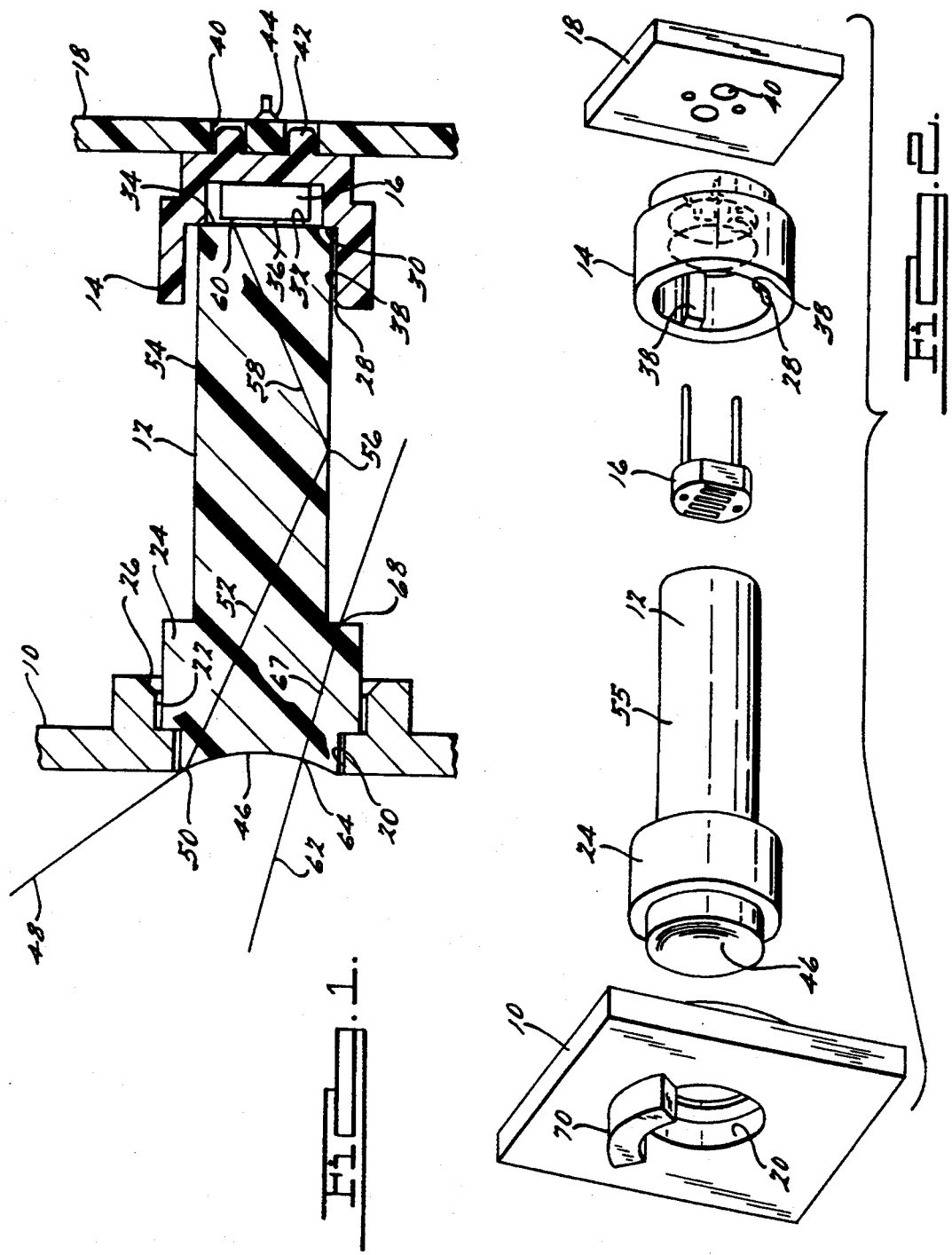

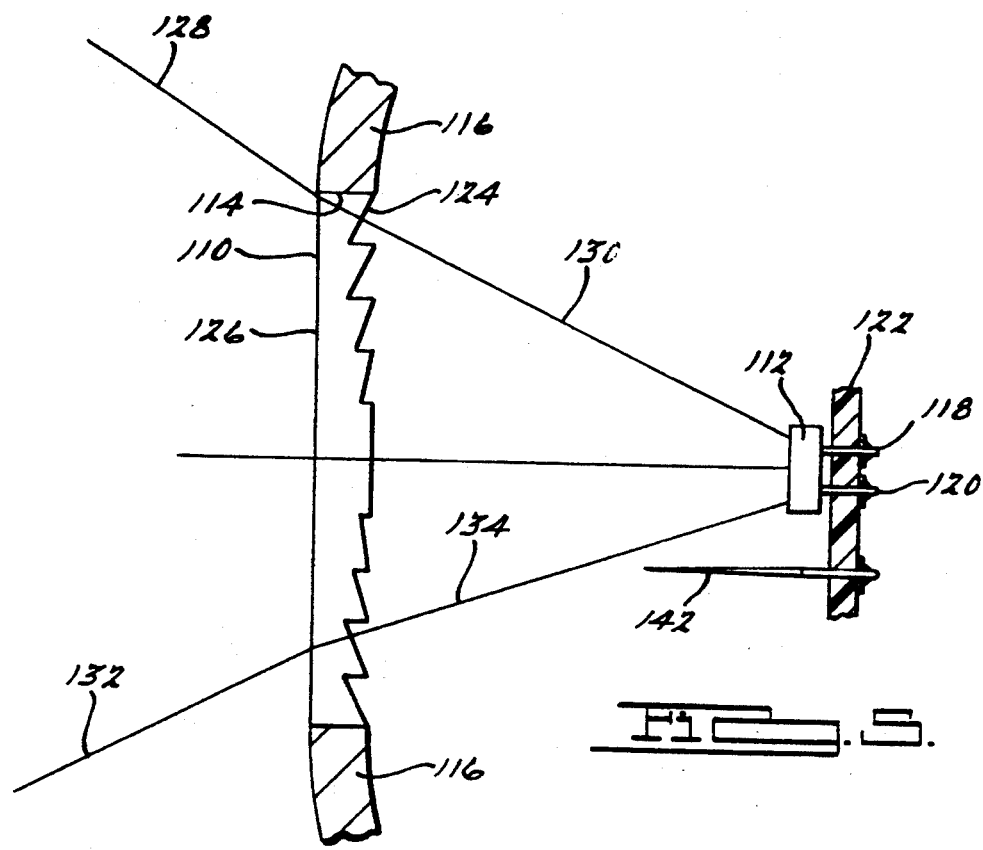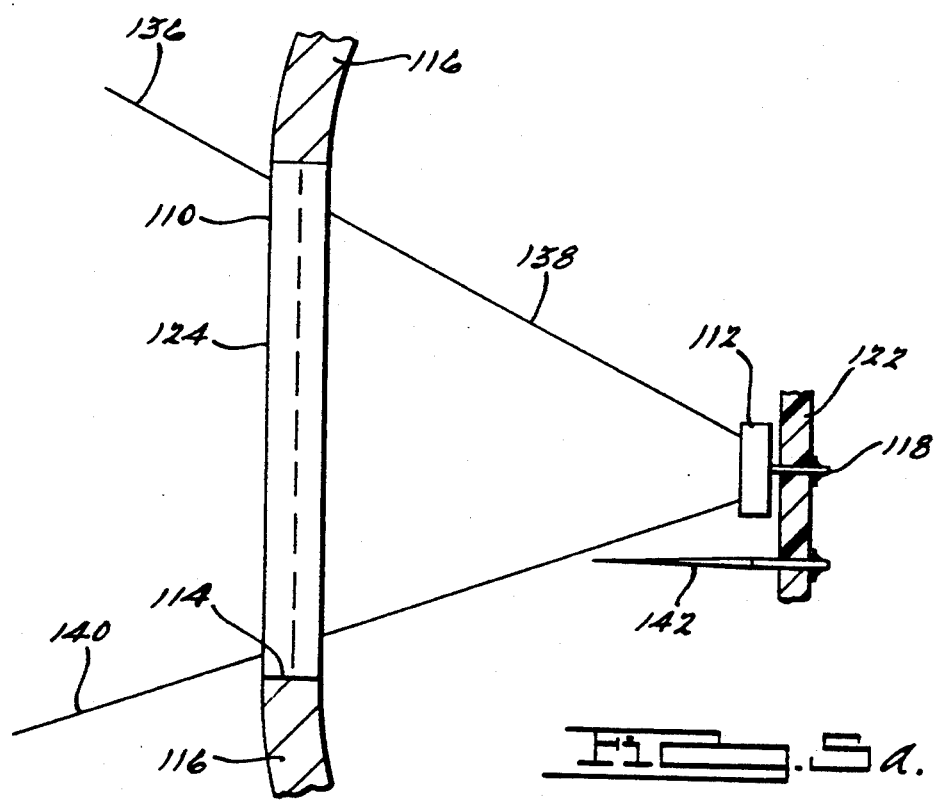

AUTOMATIC REARVIEW MIRROR INCORPORATING LIGHT PIPE

BRIEF SUMMARY OF THE INVENTION

This invention relates to light sensing means and, more particularly, to improved light sensing means adapted for use in automatic rearview mirrors for automotive vehicles.

As is well known in the art, automatic rearview mirrors for automotive vehicles have heretofore been designed to include multiple functions such as motorized positioning of mirror reflective elements, the control of the reflectivity of electrochromic elements, map lights, electronic compasses, and various other functions. Such automatic rearview mirrors incorporate light sensors, such as cadmium sulfide photo-resistive light sensors or photo-diodes or other types of sensors, which are effective to control various functions of the mirror including the reflectivity of the mirror in response to light, such as ambient light, sensed forwardly of the vehicle, and light, such as glare causing light, sensed rearwardly of the vehicle. At the same time, the printed circuit boards, to which the electrical components which perform the various mirror control functions are attached, are being made smaller. Some of the cases or housings for the mirrors which perform multiple functions are too large and too thick for it to be practical to mount the required light sensor or sensors on the mirror printed circuit board. Other situations may occur where the printed circuit board is too small to extend to the location or locations where each light level is viewed through an aperture in the mirror elements or in the mirror assembly housing. In such situations one or more of the sensing functions are required to be performed by mounting the sensors separately from the printed circuit board or by using special means to direct the light from the sensing aperture to the respective sensor. The latter approach is the one taken by the embodiments of automatic rearview mirrors described herein.

Heretofore automatic mirrors have normally used two light sensors, one to detect glare from the rear of a vehicle and one to detect the ambient light level, usually forwardly of the vehicle. These sensors have often been mounted directly on either the main printed circuit board or on an auxiliary printed circuit board and have been positioned directly in the path of the light to be measured. However, there have been some exceptions where the light sensors have been mounted on the mirror case itself and connected by sets of lead wires. Another exception has been where both sensors have been positioned on a common substrate and the light sources to be measured have been reflected to the sensor from opposing directions by two reflecting surfaces as described in U.S. Pat. No. 4,475,036. U.S. Pat. No. 5,223,814 also teaches the use of a reflector to reflect light to a photo-sensor. Mounting the sensors separately and attaching them to the circuit with wires is expensive and inconvenient for testing, for calibration, and for the assembly process. The reflector assemblies disclosed in U.S. Pat. Nos. 4,475,036 and 5,223,814 do not incorporate refracting means to properly characterize the angular response pattern to that which is needed by the application as do the devices which are disclosed herein.

U.S. Pat. Nos. 4,443,057; 4,917,477 and 5,204,778, in combination, describe in detail automatic rearview mirror control systems, and the teaching of such patents includes descriptions of many of the considerations for the positioning and for the fields of view which are preferred for the front and rear sensors. Such patents and the teachings thereof are hereby incorporated in their entirety, by reference, and details which bear directly on the present invention will be described herein in detail.

For proper operation, each of the sensors must be characterized to have the correct angular response and enough light must be directed to each sensor to assure proper performance of the sensors and of the associated electrical circuitry at the minimum operating light levels. With the means to direct the light to the sensor there is an option to concentrate the light directed to the sensor, to attenuate the light, or to leave the light level substantially unchanged. The light level range from the rear, even when viewed directly by the sensor, is seldom much above the minimum range which is required for proper performance of the sensor and its associated circuitry. Thus, it is usually necessary to use a means to direct light to the rearward sensor which maintains an optical gain which is not much below unity. Furthermore, it is often desirable for the optical gain of the means to direct light to the rear sensor to exceed unity for the rear sensor thereby utilizing the rear sensor and its associated circuit in a more stable operating range and improving the quality of the mirror control function. For the forward sensor, the light level range when viewed directly often exceeds that needed for satisfactory performance so it is often permissible to use a means to direct light to the forward sensor which has an optical gain which is less than unity.

The field of view of each sensor, i.e. its sensitivity versus the direction from which the light is coming, is an important attribute of the sensor. The rear sensor must be sensitive to light emanating from glare sources. However, if the field of view is too large, light from sources such as roadside signs will frequently cause unwanted dimming of the mirror. Thus, the field of view for the rear sensor should be generally limited to that which is required to admit the light from glare sources to which the mirror should respond. The front sensor should preferably have a field of view which generally corresponds to that which the driver sees through the windshield of the vehicle.

It should be understood that there is a subtle relationship between the relative fields of view of the front and rear sensors of the mirror. With a commonly used high sensitivity setting of the mirror control circuit, a typical mirror will dim when both the front and back light sensors are exposed to equal light levels from small area sources. However, the mirror does not normally dim during dawn and dusk when the mirror is surrounded by the panorama of light exposing both the front and back sensors to this same panorama of light because with a diffused light source, the effect of the light entering the sensor from each portion of its field of view is additive. Thus, the large field of view of the front sensor increases its sensitivity to a diffused or scattered light source which provides light over a large area within its field of view. Thus, the front sensor with its larger field of view can have a larger response to a diffused source than the rear sensor with its more restricted field of view has to the same diffused source. This can be true even when the rear sensor with its more restricted field of view is more sensitive than the front sensor to a point light source which is within its field of view. Thus, in the mirror control, the larger field of view of the front sensor can more than make up for the greater sensitivity of the rear sensor. In a typical vehicle, the viewing area of the rear sensor is restricted both by the aperture built into the mirror itself and by the walls and ceiling of the passenger compartment, while the field of view of the front sensor is made large and is less restricted by its wide angle view through the windshield.

An object of the present invention is to overcome disadvantages in prior light sensing means of the indicated character and to provide an improved light sensing means incorporating improved means effective to direct light from a convenient location to a conveniently placed sensor.

Another object of the present invention is to provide improved light sensing means incorporating improved means effective to collect light in desired proportions over a desired field of view for a light sensor and to transmit such light to the sensor.

Another object of the invention is to provide improved light sensing means which may be utilized when the desired field of view is different for the rearwardly facing sensor than for the forwardly facing sensor of an automatic rearview mirror system for an automotive vehicles.

Another object of the present invention is to provide improved light sensing means effective to optimize the performance and economy of automatic rearview mirror systems for automotive vehicles.

Another object of the present invention is to provide improved light sensing means effective to substantially smooth unwanted peaks and valleys in the sensors' angular response pattern without over scattering to the extent that the sensitivity and overall angular response are unduly compromised.

Another object of the present invention is to incorporate a Fresnel lens in an opening in the mirror case to properly characterize the angular pickup pattern of the light which is directed through the lens to the sensor.

Another object of the present invention is to incorporate a means to divert the energy from discharges of static electricity which may enter around the light pipe or lens so that it does not damage components in the electrical control circuit.

Still another object of the present invention is to provide an improved light sensing means effective to properly characterize the field of view of light sensor for its particular application. An important specific instance of this objective is to widen the field of view for the forward facing sensor.

The above as well as other objects and advantages of the present invention will become apparent from the following description, the appended claims and the accompanying drawings. dr

BRIEF DESCRIPTION OF THE DRAWINGS

FIG. 1 is a longitudinal cross-sectional view of a forwardly facing sensor and light pipe assembly embodying the present invention and as viewed from the top of an automatic rearview mirror system for automotive vehicles;

FIG. 2 is an exploded view, viewed generally from the top, of the assembly of FIG. 1;

FIGS. 5 and 5a are a top and side view, respectively, of another embodiment of the invention incorporating a Fresnel lens.

DETAILED DESCRIPTION

Figure 3:
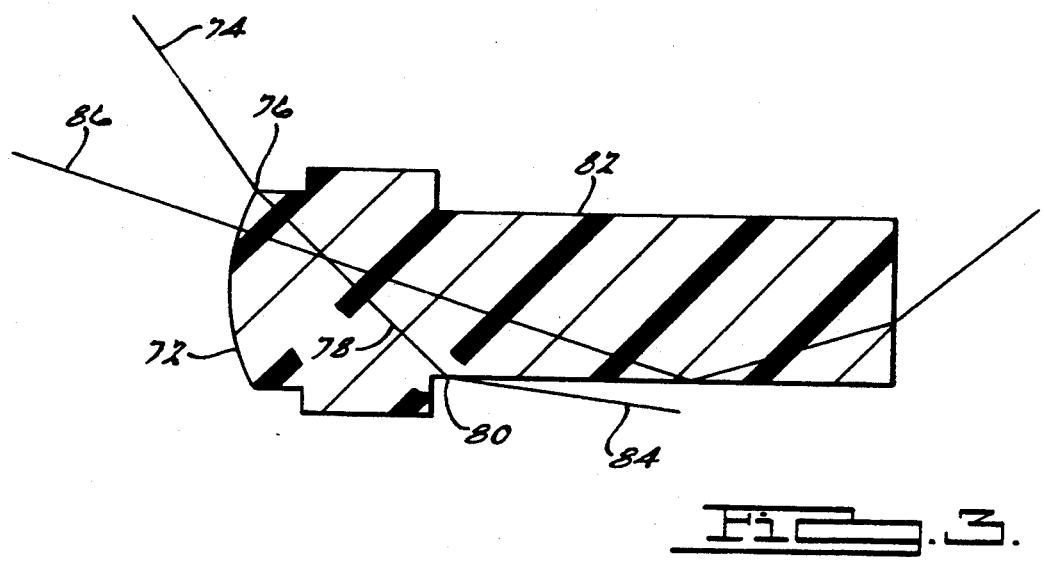
FIG. 3 is a longitudinal cross-sectional view of a light pipe intended for use in an assembly similar to FIG. 1 but which is adapted for use with a rearwardly facing sensor of an automatic rearview mirror system for automotive vehicles.

Referring to FIGS. 1 through 4, there are situations in automatic rearview mirror systems for automotive vehicles where the cost will be lowered or the performance improved by using a light pipe for either the forwardly facing sensor only, the rearwardly facing sensor only, or for both sensors. The most common situation where use of a light pipe is advantageous is one for which a light pipe is required only for the forwardly facing sensor. In the majority of these automatic rearview mirrors, the mirror case is too thick to mount the photocell directly on the circuit board and still view light from the front of a vehicle through a wide viewing angle. Thus, the light pipe arrangement for the forwardly facing sensor will be described in the greatest detail and modifications to add a light pipe to the rear sensor will be described separately.

FIG. 1 depicts a top view of the cross sectioned forwardly facing sensor assembly. A partial, sectioned view of the front of a mirror housing 10 is shown. A longitudinally sectioned view of a transparent light pipe 12 is shown, and a sectioned view of a plastic bracket 14 is illustrated. A top side view of a cadmium sulfide photo-resistive light sensor 16 is shown and a sectioned view of a portion of the printed circuit board 18 is shown.

The mirror housing defines an opening 20 and is provided with a flange 22 which adjoins a mating flange 24 of light pipe 12 and serves to position the light pipe in the opening 20 provided in the mirror housing and to keep the light pipe from sliding out through the opening 20. The chamfer 26 is provided leading into the flanged portion of the housing to facilitate assembly. The plastic holder 14 secures and positions the other end of the light pipe 12 and positions and holds the photo-resistive light sensor 16. The chamfer 28 facilitates insertion of the end of light pipe 12 in the holder 14. A ledge 30 maintains a small but consistent space 32 between the end 34 of the light pipe and the photocell face 36. Three or more ribs, one of which is shown at 38, are molded into the plastic holder 14 and equally spaced around the circumference to prevent large area contact between the holder 14 and the light pipe 12. Such area of contact if not prevented could limit the capability of the light pipe to internally reflect the light rays.

The circuit board 18 defines a pair of holes 40 which key the mating positioning tabs 42 on plastic holder 14. The solder connection 44 is one of the two lead wire connections of the photocell 16 to separate conductive circuit traces on the printed circuit board. The circuit, the mirror element, and the remainder of the automatic rearview mirror may be constructed in accordance with teaching in any of the above referenced patents which are incorporated herein by reference.

The light pipe 12 is preferably made from a clear grade of polycarbonate or from acrylic. The acrylic has the greater clarity but may be marginal in meeting maximum temperature requirements and is more brittle and subject to cracking. In lengths and configurations where the slightly reduced clarity of the polycarbonate yields satisfactory results, it is suggested as the best mode plastic for the light pipe. The light pipe holder 14 is preferably made of a soft plastic and sized so that the light pipe 12 is held in place by a light press fit. This facilitates assembly and eliminates the chance that the light pipe will rattle in the plastic holder 14. Although not necessary to retain the internal reflection, ribs similar to those used in the holder may be incorporated in the housing 10. Such ribs allow enough compliance so that the light pipe 12 and the mating ribbed hole in the mirror housing can be sized to allow insertion with a very light press fit. Such an arrangement will permit easy assembly while eliminating the possibility that vibration will cause the light pipe to rattle in the mirror housing opening 20.

The viewing end 46 of the light pipe is concave to increase the viewing angle of the light pipe. A light ray 48 enters the opening of the light pipe at point 50 and continues into the light pipe as ray 52. The ray 52 is bent somewhat closer to the direction of the longitudinal axis of the light pipe because of the slope of the lens surface at point 50 which is due to the concave curvature of the light pipe face 46. The ray 52 strikes the cylindrical surface 54 of the light pipe at 56 and is internally reflected as ray 58 which exits the light pipe. The ray 58 is refracted in a direction which diverges from the direction of the longitudinal axis of the light pipe and continues as ray 60 which finally strikes the face 36 of the photocell. Because the ray 60 is refracted to a more divergent angle when it exits the light pipe, it is prudent to minimize the distance between the end 34 of the light pipe and the photocell surface 36 because a significantly greater distance would cause this ray to miss the photocell thereby reducing the light level reading of the photocell. Rays which diverge too much from the direction of the longitudinal axis of the light pipe are not internally reflected by the cylindrical surface 54 of the light pipe but pass through it. This loss of rays coming too much from the side limits the range of angles over which rays are transmitted to the photocell by the light pipe. It has been verified experimentally that use of a 0.375 inch diameter concave entrance section having a radius of curvature of approximately 0.25 inches and a 0.25 inch diameter for the cylindrical section of the light pipe 12 increased the angle of acceptance substantially over that of a light pipe with a flat end. It is suggested that the best radius of curvature be determined by experimentation and also that the concave surface 46 need not be spherical. A shape approaching a conical shape where the radius of curvature decreases toward the center may be preferred. At the same time the peak response to a small area light source directly in front of the light pipe was reduced by about 20 percent relative to the light received directly by the photocell from the same light source when the light pipe is removed. As indicated earlier, this modest reduction in sensitivity is normally permissible for the forwardly facing sensor so the design trade here which increases the viewing angle while causing a modest loss in sensitivity is a good one. To illustrate why the sensitivity to directly impinging rays is reduced, note that the ray 62 which enters the light pipe at point 64 continues as ray 67 and exits at point 68. If the light pipe had been a simple straight cylindrical piece formed by eliminating the wider head and extending the cylindrical section of the light pipe 12, this ray would have been captured. It should be noted that although the modification indicated here normally improves performance substantially, a simple, straight, flat ended light pipe can give acceptable performance and is not outside of the scope of this invention.

One final problem must be solved in order to give the best performance. As a light source moves across the viewing aperture (from top to bottom in FIG. 1), the entering light ray first reflects off of the lower surface of the light pipe as illustrated by the rays 48, 52, 58 and 60. A ray from a source which is axially aligned with the light pipe passes directly to the sensor without reflection and a ray from a source substantially below the axis of the light pipe as viewed in FIG. 1 is reflected from the top surface of the cylindrical light pipe 12 so that the ray path is approximately a mirror image of the path taken by the ray 48 which has been traced. These changes in path and reflective modes for rays coming from different directions cause substantial variations in the sensor response as the light source traverses the aperture of the sensor assembly. One way to eliminate most of the variations is to frost the surface 46 where the light enters. However, this scatters many of the entering rays through angles which diverge so far from the axis of the light pipe that they are not reflected from, but rather are lost through, the wall of cylindrical section of the light pipe thereby reducing the sensitivity of the light pipe substantially and altering the angular response pattern. Furthermore, the loss is most severe for the rays which entered at the largest angle, thus, making wide angle scattering directly counterproductive to the attempts to increase the viewing angle of the sensor. The angular spacing between the peaks and valleys in the response curve, due to the shifts in reflective mode, are fairly closely spaced. Thus, the individual peaks can be averaged into adjacent valleys and vice versa by scattering the light through comparably small angles. This type of scattering, in which the majority of the rays are scattered through the limited range of angles, is achieved by texturing the surface 46 of the entrance lens. Either a regular but very shallow pyramid pattern or a more random "orange peel" like pattern are two texturing options which may be used to create the scattering through a limited angle. If desired, other texturing options may be utilized. To limit the angle of the scattering, the deviation in the angle of the normal to each (or at least most of) the elements of the textured surface from the angle of the corresponding normal of the concave reference surface must be kept small enough to locally refract the light rays only in the range of angles for which the limited scattering is desired.

FIG. 2 is an exploded view of the sensor configuration shown in FIG. 1. It is included to complement the sectioned view in FIG. 1. The only feature not evident in FIG. 1 is a visor 70 which is placed over the sensor aperture 20 to shield the front sensor from lamps which are directly overhead. Reasons for this are detailed in the referenced patents. It should be noted that with the light pipe, it is possible to restrict the upward viewing angle by altering the design of the light pipe instead of using the visor. Such a modification is desirable in many embodiments but in this one would result in a more complicated design for the light pipe which would no longer be symmetrical about its center axis so that it would have to be keyed to maintain its proper orientation.

FIG. 3 is a cross-sectional view of a light pipe which is designed to replace the light pipe of FIG. 1 for a rearwardly facing sensor application in an automatic rearview mirror system. The concave entrance lens surface 46 of FIG. 1 has been replaced by a mildly convex surface 72. The light ray 74 entering the lens at 76 from an angle similar to the entrance of light ray 48 of FIG. 1 is not refracted sufficiently toward the longitudinal axis of the light pipe to be internally reflected. Instead of being directed to the sensor by the light pipe, it travels as ray 78 to point 80 on the surface of light pipe 82 and through the surface where it is lost as ray 84 outside the light pipe. The ray 86 which is more nearly in line with the longitudinal axis of the light pipe than ray 48 of FIG. 1 is captured by the light pipe and directed to the sensor. Caution must be used to not make the acceptance angle too narrow. Providing a larger radius of curvature (i.e. more nearly flat) for surface 72 increases the acceptance angle of the lens and reduces the optical gain. The optical gain is increased by the convex lens and serves to enhance the normally weak optical signal to the rearwardly facing sensor. The variations in response with angle are not as predominant with the convex lens but can be averaged by the same type of texturing and limited angle scattering as used for the light pipe of FIG. 1. It should be noted that the aperture 20 in the housing does not need to be on the same axis or even to be aligned in the same direction as the sensor face. The cylindrical sections such as 54, 55 or 82 can for example be elongated or bent in gentle curves. Reflections can also be added to redirect the light through greater directional changes.

Experimental Results

Figure 4:
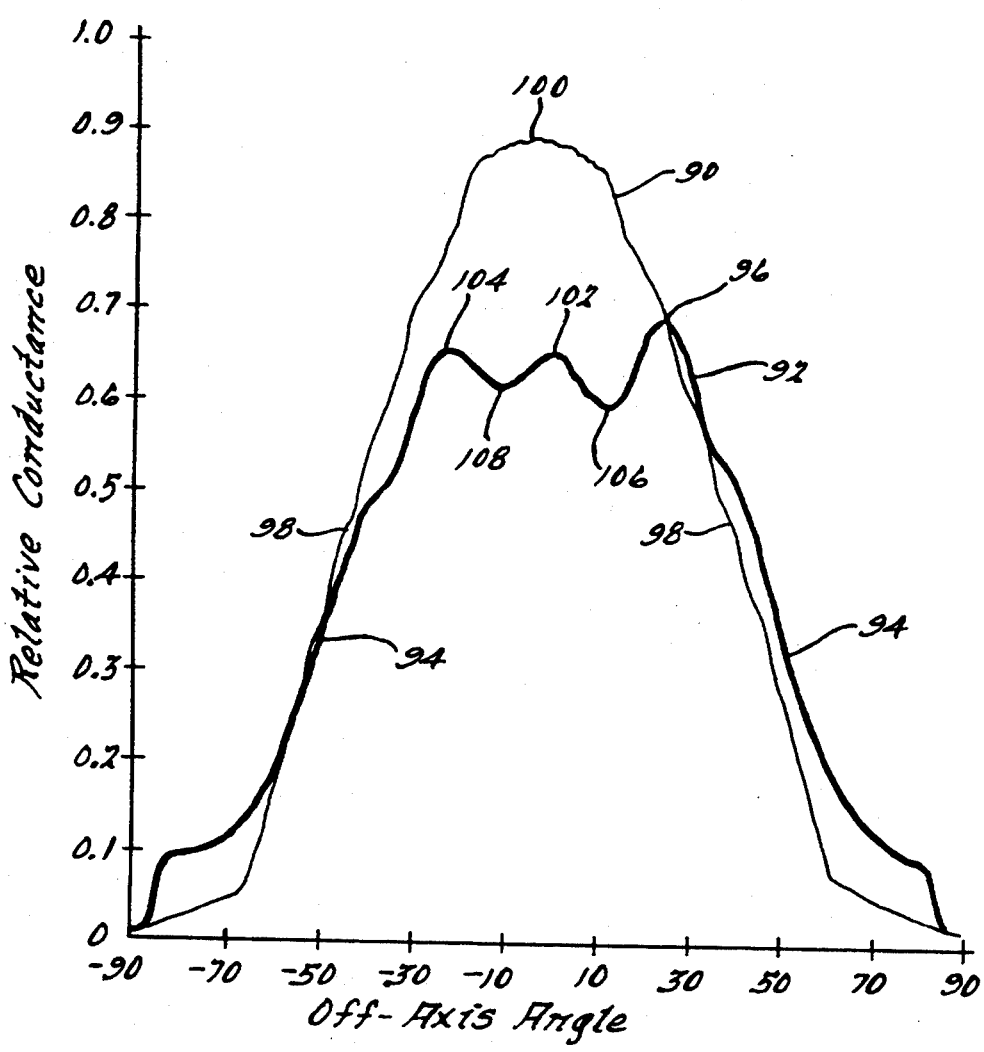
FIG. 4 is a plot comparing the response versus angle of a photocell with and without a light pipe similar to the one illustrated in FIG. 1.

Referring to FIG. 4, the two curves 90 and 92 are plots of the relative conductance of a cadmium sulfide photo-resistive sensor versus the off-axis angle of the light source. The thin line curve 90 is a plot for the photocell alone and the heavier line curve 92 is a plot for the same photocell to which a light pipe similar to that depicted in FIG. 1 has been added. Points 94 are the points for which the response of the photocell with the light pipe is 50 percent of its maximum response at point 96. These 50 percent response points are separated by 96 degrees. Similarly, points 98 are the points for which the response of the photocell without the light pipe is 50 percent of its maximum response at point 100. These 50 percent response points are separated by 86 degrees. Thus, the light pipe with the specially designed lens has not only prevented the light pipe from narrowing the angular pattern but has widened it instead which is desirable for the front sensor. Some ripple shown at peaks 96, 102 and 104 and valleys 106 and 108 is still present for the response with the light pipe. This is a tolerable amount but could be further reduced by mildly increasing the texturing of the lens surface to moderately increase the angle through which the light rays are scattered.

FIG. 5 is the simplified top view and FIG. 5a is the simplified side view of another embodiment of the invention. In this embodiment of the invention, a Fresnel lens 110 is provided which is used to characterize the sensitivity versus direction for a forwardly facing sensor 112. The lens 110 is secured in an opening 114 in mirror housing 116 which is shown in fragmentary view. In the configuration shown the leads 118 and 120 of cadmium sulfide photo-resistor 112 are soldered to conductive tracks on the circuit board 122 which is shown in fragmentary view. The circuit board is mounted at a substantial distance back of the lens 110 and housing opening 114 so that the direct lines of view to the sides are blocked by the walls of the mirror housing. In many situations it is not practical or aesthetically pleasing to make the opening large enough to provide the required field of view without the aid of something to direct the light rays. The angled portion 124 of top view 126 of lens 110 refracts light ray 128 so that it continues as ray 130 to the photosensitive face of photocell 112. Likewise ray 132 coming from the opposite side is bent so that it continues as ray 134 to the face of the photocell 112. The rays 128 and 132 coming from the large side angles would not have hit the sensing area of the photocell were it not for the lens. Thus, the lens 110 serves to direct the rays 128 and 132 which are within the desired field of view to the photocell where they are sensed. In practice, the width of surface 124 of the lens and of the surfaces like it would normally be made shorter and the surfaces more numerous. The relatively small number of surfaces is depicted for graphical clarity.

Referring to FIG. 5a, the elevational view indicated by the ray 136 is satisfactory so the lens is not designed to appreciably alter its elevational direction as it continues as ray 138 to the face of the sensor 112. Likewise rays coming from an elevational direction much below that of ray 140 would normally be blocked by the hood of the vehicle so it is not necessary to include rays coming from lower elevational angles in the sensing pattern. Since the rays 136 and 140 do not have to be refracted to a different elevational angle by the lens, the lens is of a cylindrical design.

Other applications require lenses which bend the light rays in both vertical and horizontal directions. Such lenses may be designed to characterize the directional sensitivity in accordance with the present invention. The negative focal length of lens 110 causes a modest reduction in the light level measured by the photocell as compared with a configuration designed for direct viewing. As indicated above, this is acceptable for the forwardly facing sensor. For a rearwardly facing sensor, a lens of positive focal length which is similar in construction to the one shown may be used to restrict instead of to increase the field of view and to at the same time desirably increase the light level which reaches the photocell. In certain circumstances, for example, those which require a specially shaped opening, it may be desirable to provide a negative focal length in one orientation and a positive focal length in another to properly shape the directional sensitivity pattern of the sensor. This might well be the case for either the forwardly facing or the rearwardly facing sensor if a long and narrow aperture is provided for the light to enter the sensor housing.

The projection 142 is a conductive point or other conductive object which is placed to serve as a lightning rod to divert sparks from static electricity which may enter around the edges of the lens and which could otherwise discharge to a point on the photocell or circuit board and thereby damage a component. The projection 142 is preferably attached to circuit ground but may alternately be attached to or routed close enough to any conductor which will carry the spark energy away from projection 142 without damage to the circuit. A first alternative to the spark arrestor is to use a lens which is integrally molded into the housing or which is otherwise attached to the housing so as to form an insulating barrier to the sparks. A second alternative is to provide physical spacing which is adequate to prevent sparks from expected static sources from bridging the gap from the opening around the light pipe or lens to the photocell or other vulnerable components.

For many electrostatic discharge requirements, the embodiment in FIG. 1 provides such a spacing. Any of the methods just enumerated can be applied to light pipes such as shown in FIG. 1 when the spacing is not adequate. Also, light pipe holder 14 in FIG. 1 may be made of conductive material and attached to or routed close to a suitable discharge path to serve as the spark arrestor. When using a conductive holder, spacing to the photocell leads must be adequate to prevent short circuits or unwanted leakage currents.

Several desirable features of any one of the designs may be incorporated interchangeably in another of the designs. For example, the lens in FIG. 5 does not have to be of the Fresnel type but could be of a non-Fresnel type such as used in FIG. 1. Secondly, a Fresnel type of lens could be used for the front surface of the light pipe in FIGS. 1, 2 and 3. Thirdly, a lens may be used on the inside end of the light pipe which otherwise has a design similar to that of FIG. 1 to characterize the light pattern projected onto the photocell surface. In such a design the spacing between the end of the light pipe and the photocell surface may be increased perhaps at the cost of a reduced amount of light being transmitted to the photocell. Fourth, as an alternate construction in FIG. 1, the light pipe may be secured to the housing thereby eliminating the need for holder 14. The photocell may then be mounted directly to the circuit board or a simpler spacer or holder may be substituted for holder 14 depicted in FIG. 1.

It will be understood that the plastic in the light pipe and lens configurations can be tinted to further characterize the sensor for a particular color response characteristic. It should also be understood that the above description is applicable to photo-diodes, and other types of sensors and not limited to the photo-resistors used in the preferred embodiment.

While preferred embodiments of the invention have been illustrated and described, it will be understood that various changes and modifications may be made without departing from the spirit of the invention.

What is claimed is:

1. In a light sensing device, the combination including light sensing means effective to detect light and generate a corresponding electrical signal indicative of the light level, light directing means, and means mounting said light directing means in spaced relationship with respect to said light sensing means whereby light passing through said light directing means impinges on said light sensing means, said light directing means being in the form of a light pipe, one end of said light pipe defining a curvilinear lens.

2. In an automatic rearview mirror system for automotive vehicles, the combination including a variable reflectance member the reflectivity of which varies as a function of an electrical signal, light sensing means effective to sense light and generate a corresponding electrical signal indicative of the sensed light level, a light pipe, said light pipe having the capability of internally reflecting light impinging on one end thereof to the other end thereof, said one end of said light pipe defining a curvilinear lens, means mounting said light pipe adjacent said light sensing means whereby light emanating from said other end of said light pipe impinges upon said light sensing means, and means operable to change the reflectivity of said reflectance member as a function of an electrical signal generated by said light sensing means.

3. In an automatic rearview mirror system for automotive vehicles, the combination including a variable reflectance member the reflectivity of which varies as a function of an electrical signal, light sensing means effective to sense light and generate a corresponding electrical signal indicative of the sensed light level, a light pipe, said light pipe having the capability of internally reflecting light impinging on one end thereof to the other end thereof, said one end of said light pipe defining a concave lens, means mounting said light pipe adjacent said light sensing means whereby light emanating from said other end of said light pipe impinges upon said light sensing means, and means operable to change the reflectivity of said reflectance member as a function of an electrical signal generated by said light sensing means.

4. In an automatic rearview mirror system for automotive vehicles, the combination including a variable reflectance member the reflectivity of which varies as a function of an electrical signal, light sensing means effective to sense light and generate a corresponding electrical signal indicative of the sensed light level, a light pipe, said light pipe having the capability of internally reflecting light impinging on one end thereof to the other end thereof, said one end of said light pipe defining a convex lens means mounting said light pipe adjacent said light sensing means whereby light emanating from said other end of said light pipe impinges upon said light sensing means, and means operable to change the reflectivity of said reflectance member as a function of an electrical signal generated by said light sensing means.

5. In an automatic rearview mirror system for automotive vehicles, the combination including a variable reflectance member the reflectivity of which varies as a function of an electrical signal, light sensing means effective to sense light and generate a corresponding electrical signal indicative of the sensed light level, a light pipe, said light pipe having the capability of internally reflecting light impinging on one end thereof to the other end thereof, said one end of said light pipe defining a Fresnel lens, means mounting said light pipe adjacent said light sensing means whereby light emanating from said other end of said light pipe impinges upon said light sensing means, and means operable to change the reflectivity of said reflectance member as a function of an electrical signal generated by said light sensing means.

6. In a light sensing device, the combination including a housing having a front wall and defining a chamber, said front wall defining an opening communicating with said chamber, a base disposed within said chamber, light sensing means mounted on such base and effective to detect light and generate a corresponding electrical signal indicative of the light level, a light pipe, said light pipe being mounted in said chamber and extending between said opening in said front wall and said base, said light pipe being capable of internally reflecting light impinging on one end thereof to the other end thereof, said one end of said light pipe defining a curvilinear lens, said other end of said light pipe being disposed in confronting relationship with respect to said light sensing means.

7. In a light sensing device, the combination including a housing having a front wall and defining a chamber, said front wall defining an opening communicating with said chamber, a base disposed within said chamber, light sensing means mounted on such base and effective to detect light and generate a corresponding electrical signal indicative of the light level, a light pipe, said light pipe being mounted in said chamber and extending between said opening in said front wall and said base, said light pipe being capable of internally reflecting light impinging on one end thereof to the other end thereof, said one end of said light pipe defining a concave lens, said other end of said light pipe being disposed in confronting relationship with respect to said light sensing means.

8. In a light sensing device, the combination including a housing having a front wall and defining a chamber, said front wall defining an opening communicating with said chamber, a base disposed within said chamber, light sensing means mounted on such base and effective to detect light and generate a corresponding electrical signal indicative of the light level, a light pipe, said light pipe being mounted in said chamber and extending between said opening in said front wall and said base, said light pipe being capable of internally reflecting light impinging on one end thereof to the other end thereof, said one end of said light pipe defining a convex lens, said other end of said light pipe being disposed in confronting relationship with respect to said light sensing means.

9. In a light sensing device, the combination including a housing having a front wall and defining a chamber, said front wall defining an opening communicating with said chamber, a base disposed within said chamber, light sensing means mounted on such base and effective to detect light and generate a corresponding electrical signal indicative of the light level, a light pipe, said light pipe being mounted in said chamber and extending between said opening in said front wall and said base, said light pipe being capable of internally reflecting light impinging on one end thereof to the other end thereof, said one end of said light pipe defining a Fresnel lens, said other end of said light pipe being disposed in confronting relationship with respect to said light sensing means.

* * * * *